US008317222B2

(12) United States Patent  (10) Patent No.: US 8,317,222 B2
Arnold et al.  (45) Date of Patent: Nov. 27, 2012

(54) INFLATABLE SEAT BELT SYSTEM

(75) Inventors: David R. Arnold, Macomb, MI (US);
Srinivasan Sundararajan, Ann Arbor, MI (US); Dean M. Jaradi, Macomb, MI (US); Edward Joseph Desmet, Canton, MI (US); Rudi Grzic, Sterling Heights, MI (US)

(73) Assignees: Ford Global Technologies, LLC, Dearborn, MI (US); Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 12/993,483

(22) PCT Filed: Jun. 19, 2009

(86) PCT No.: PCT/US2009/047986
§ 371 (c)(1),
(2), (4) Date: Nov. 19, 2010

(87) PCT Pub. No.: WO2009/155534
PCT Pub. Date: Dec. 23, 2009

(65) Prior Publication Data
US 2011/0068565 A1  Mar. 24, 2011

Related U.S. Application Data

(60) Provisional application No. 61/074,526, filed on Jun. 20, 2008.

(51) Int. Cl.
B60R 21/18 (2006.01)
B60R 22/28 (2006.01)
(52) U.S. Cl. ........ 280/733; 280/805; 180/268; 297/470; 297/471

(58) Field of Classification Search .................. 280/733, 280/801.1, 805, 808; 180/268; 297/468, 297/470, 471, 473
See application file for complete search history.

(56) References Cited

U.S. PATENT DOCUMENTS

| 3,343,229 A | 9/1967 | Tanaka |
| 3,791,670 A | 2/1974 | Lucore et al. |
| 3,929,348 A | 12/1975 | Lawwill |
| 5,354,096 A | 10/1994 | Tanaka et al. |
| 5,385,367 A | 1/1995 | Tanaka et al. |
| 5,413,377 A | 5/1995 | Kamiyama et al. |
| 5,445,411 A | 8/1995 | Kamiyama et al. |

(Continued)

FOREIGN PATENT DOCUMENTS
DE 19844137 4/1999
(Continued)

OTHER PUBLICATIONS

International Search Report for PCT/US2009/047986 dated Aug. 17, 2009.

(Continued)

Primary Examiner — Paul N Dickson
Assistant Examiner — James English
(74) Attorney, Agent, or Firm — Frank MacKenzie; Brooks Kushman P.C.

(57) ABSTRACT

An inflatable member is inflated by compressed gas that flows through the latch and hollow tubular tongue of a seat belt anchor. The inflatable member is retained in an uninflated condition in a split two layer belt. The latch is pivotally secured to a conduit that receives compressed inflation gas from a cylinder that is provided with a diffuser.

17 Claims, 4 Drawing Sheets

U.S. PATENT DOCUMENTS

| | | | |
|---|---|---|---|
| 6,019,388 A * | 2/2000 | Okazaki et al. | 280/733 |
| 6,062,597 A | 5/2000 | Suyama | |
| 6,082,763 A | 7/2000 | Kokeguchi | |
| 6,109,647 A | 8/2000 | Akaba et al. | |
| 6,116,637 A * | 9/2000 | Takeuchi et al. | 280/733 |
| 6,142,512 A | 11/2000 | Suyama | |
| 6,168,195 B1 * | 1/2001 | Okazaki et al. | 280/733 |
| 6,168,196 B1 | 1/2001 | Nariyasu | |
| 6,170,863 B1 | 1/2001 | Takeuchi et al. | |
| 6,220,626 B1 | 4/2001 | Utsumi et al. | |
| 6,336,657 B1 * | 1/2002 | Akaba et al. | 280/733 |
| 6,417,243 B1 | 7/2002 | Peeters et al. | |
| 6,471,243 B1 | 10/2002 | Brown | |
| 6,533,315 B2 * | 3/2003 | Brown et al. | 280/733 |
| 6,591,465 B2 | 7/2003 | Suyama | |
| 6,883,829 B2 * | 4/2005 | Suyama et al. | 280/736 |
| 7,748,735 B2 * | 7/2010 | Itoga | 280/733 |
| 2001/0034929 A1 | 11/2001 | Suyama | |
| 2002/0067031 A1 * | 6/2002 | Busgen et al. | 280/733 |
| 2003/0015863 A1 | 1/2003 | Brown et al. | |

FOREIGN PATENT DOCUMENTS

| | | |
|---|---|---|
| GB | 2260782 | 4/1993 |
| JP | 10297403 | 11/1998 |
| JP | 11170949 A | 6/1999 |
| JP | 200052918 | 2/2000 |
| JP | 2001270418 | 10/2001 |
| JP | 2001322522 | 11/2001 |

OTHER PUBLICATIONS

Extended European Search Report for European Application No. 09767843.7 dated Aug. 21, 2012.

* cited by examiner

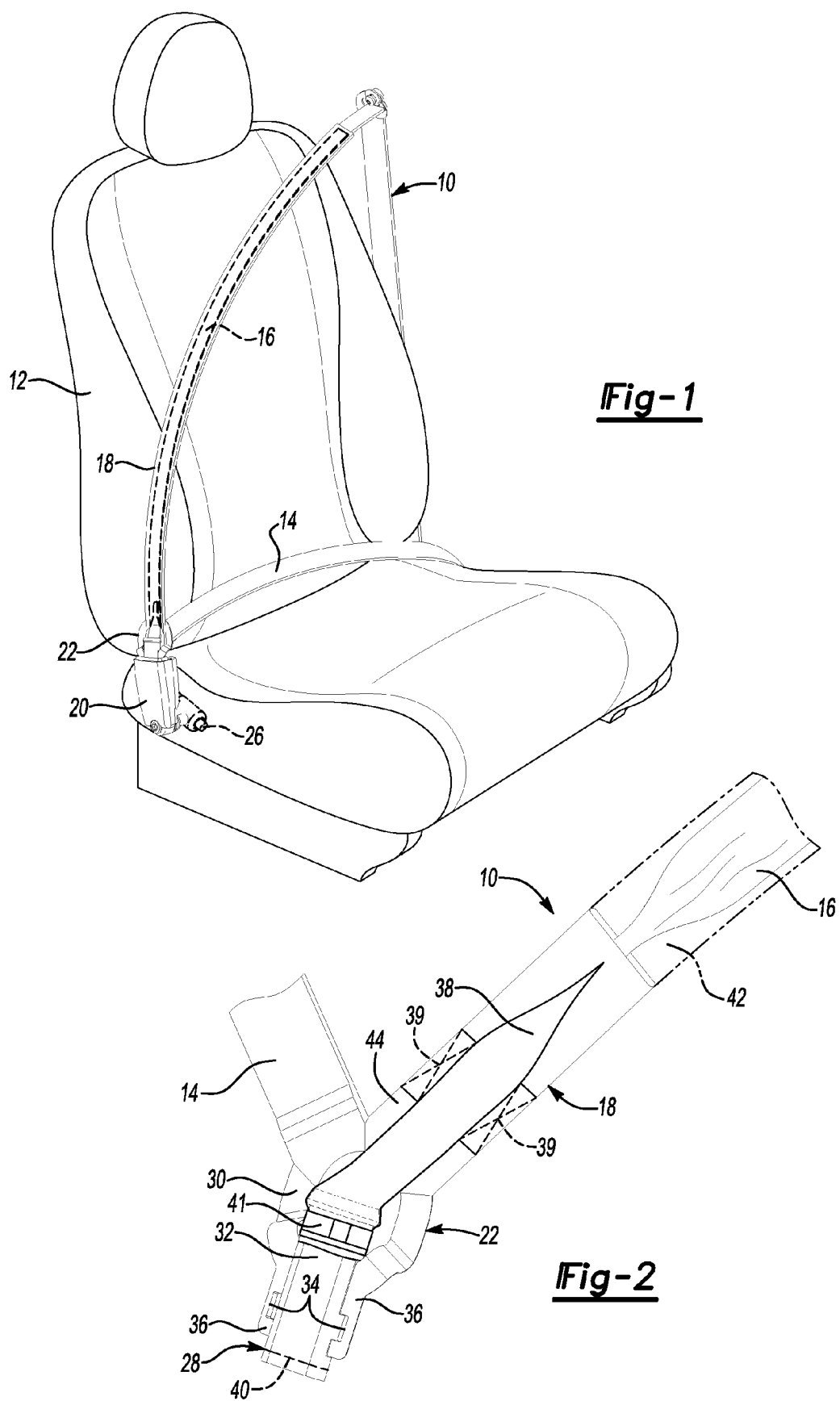

INFLATABLE SEAT BELT SYSTEM

CROSS-REFERENCE TO RELATED APPLICATION

This application claims the benefit of U.S. provisional patent application Ser. No. 61/074,526, filed Jun. 20, 2008.

BACKGROUND

1. Technical Field

A vehicle occupant protection system that includes an inflatable member that is inflated by gas that is directed through the buckle and tongue of the seat belt latch mechanism.

2. Background Art

Seat belt harnesses are available that extend across the lap and torso of an occupant to hold an occupant within a vehicle in a collision. Lap and shoulder belts do not normally provide a cushion or a shield against impact. A seat belt when properly secured is generally effective to restrain an occupant during a collision. To reduce the likelihood or severity of contact by an occupant's body with a collapsing portion of the vehicle or an intruding vehicle, air bags have been developed that are deployed from various locations in the passenger compartment. Air bags may be deployed from the dashboard, roof rails, roof support beams, headliners, steering wheels, seats and other parts of a vehicle interior.

The area in front of an occupant of a vehicle is an important area to be protected by an air bag in the event of a collision. This area may be protected by a dashboard or a steering wheel mounted air bag. However, the large volume to be filled in this area necessitates the use of a larger air bag that takes more time to inflate.

Shoulder strap seat belt systems provide added assurance that the front torso is protected in a collision. Prior art inflatable lap or shoulder belts in general had large belts and bulky connectors that were required to provide clearance for inflation gas tubes, hoses and fittings. In some prior art systems, inflation gas sources use hot pyrotechnic inflation techniques that required the inflators are remotely located relative to the vehicle occupants. Such inflators are generally mounted in the vehicle structure to avoid contact with the hot inflator. Prior art inflatable seat belt systems, in some instances, had inflation gas sources that were mounted in the vehicle frame or pillar structure that necessitated providing elongated tubes, or conduits, to the seat belt structure.

These and other problems encountered by prior inflatable seat belt systems are addressed by Applicants' invention as summarized below.

SUMMARY

An inflatable seat belt system includes a buckle and tongue that are secured together to buckle the seat belt and also cooperate to define a path through which inflation gas is provided to an inflatable member that is secured to the seat belt. Gas flows through the buckle and tongue. The portion of the buckle that receives the tongue of the seat belt may also function as an ejector for ejecting the seat belt when the seat belt latch is released. A seal connection is provided between the buckle and the tongue. A pair of seal surfaces are provided at the interface. A spring biases a first tubular member provided by the buckle into engagement with a second tubular member provided by the tongue of the seat belt anchor.

According to another aspect of the invention, a cold inflation compressed gas source, or cylinder, is secured to the buckle by a pivotal connection that permits the buckle to pivot relative to the inflation gas cylinder. The buckle can be configured to pivot about the conduit while maintaining an adequate fluid seal with the conduit that connects the cold inflation gas source to the seat belt buckle. By improving the pivotability of the buckle portion of the seat belt system, the flexibility of the system is improved and the buckle may be oriented to be conveniently latched.

According to another aspect of the invention, the inflator may include a tube that terminates in a diffuser within a cavity defined in the buckle. As an alternative to providing a buckle mounted cold inflation gas cylinder, a remotely located inflation gas source may be provided that is connected to the seat belt buckle by a tube or conduit.

According to another aspect of the invention, a special seat belt is woven to provide a flat seat belt structure with an inflatable member disposed between two layers of the seat belt. Both ends of the inflatable member are sewn to the seat belt at spaced locations with one end being sewn to the belt at the corners to define an inlet. A port is provided from the tongue of the seat buckle anchor to the air bag within the belt. The special seat belt includes at least one frangible seam that is broken when the inflatable member is inflated.

These and other objects and advantages of the inflatable seat belt system disclosed by Applicants will be better understood in view of the attached drawings and the following detailed description.

BRIEF DESCRIPTION OF THE DRAWINGS

FIG. 1 is a perspective view of a vehicle seat including a seat belt harness with an inflatable member disposed in the shoulder belt;

FIG. 2 is a fragmentary elevation view of a seat belt harness and belt anchor with an inflatable member disposed within the shoulder belt;

DETAILED DESCRIPTION

Figure 3:
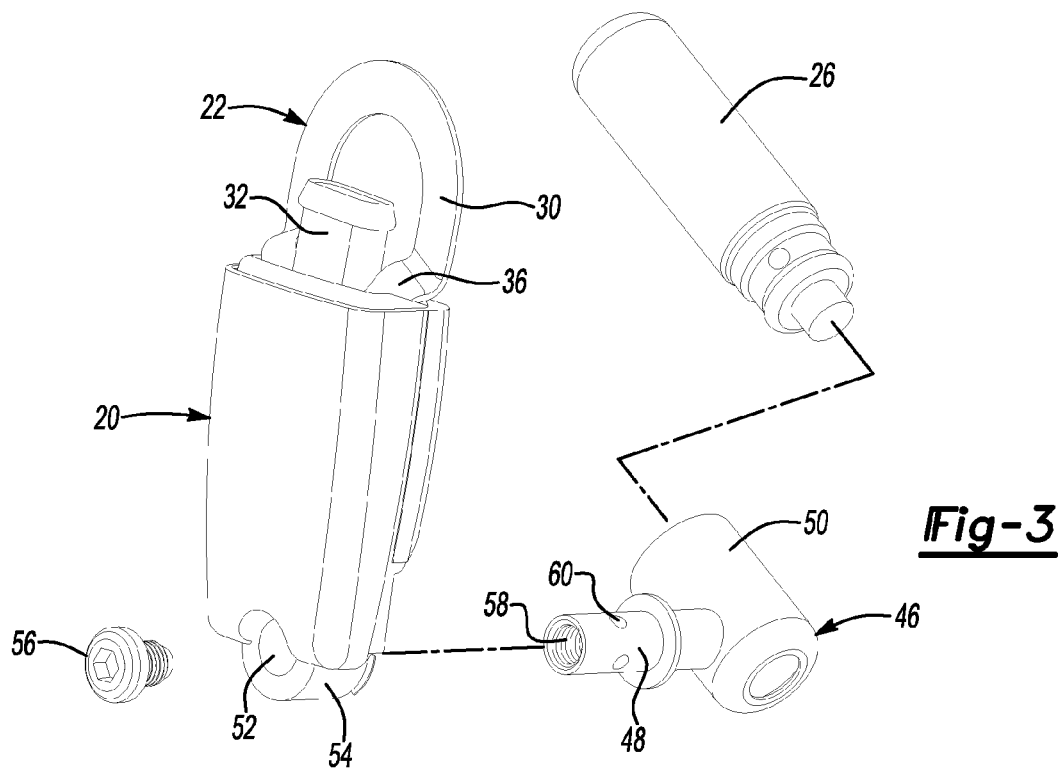
FIG. 3 is an outer perspective view of a latch with the belt anchor inserted and a compressed gas cylinder and diffuser exploded from the latch.

Referring to FIG. 1, a seat belt harness 10 is shown in its latched position extending across a vehicle seat 12. The seat belt harness 10 includes a lap belt 14 and an inflatable member 16, or air bag, in its uninflated condition within a shoulder belt 18. The lap belt 14 and shoulder belt 18 are attached to retractors (not shown) that retract the belts when not in use as is well known in the art. A latch 20 is secured to the seat 12 and the seat belt harness 10 is secured to the latch 20 by a belt anchor 22. An inflator 26 is shown in phantom which is connected to the latch 20. The inflator 26 may be a cold inflator that has compressed gas in a cylinder, as shown, a pyrotechnic inflator, a hybrid inflator, or the like.

Referring to FIG. 2, the seat belt harness 10 and belt anchor 22 are shown in greater detail. The lap belt 14 and shoulder belt 18 are secured to the belt anchor 22. The belt anchor 22 includes a tongue 28 that is received by the latch 20. A loop 30 is secured to the tongue 28 by welding, braising or by another joining technique. The lap belt 14 and shoulder belt 18 are secured to the loop 30. The tongue 28 includes a tubular body 32. A pair of latch openings 34 are provided in flanges 36 that extend outwardly from the tubular body 32 on opposite sides of the tubular body 32. An inlet tube 38 of the inflatable member 16 is connected to the tubular body 32. As will be described more fully below, compressed gas flows through the tubular body 32 to the inlet tube 38 when a collision is detected. The inflatable member 16 is received in a hollow, or split, two layer belt 42. The split two layer belt 42 is contiguous with a two layer non-split belt 44 on opposite ends.

The inlet tube 38 is secured to the hollow belt 42 by folding over corners 39 that are then sewn to the belt 42. The corners 39 secure one end of the inflatable member to the belt 42. The inlet tube 38 is located between the corners 39, but is not sewn to the belt 42 so that it remains open. The tube 38 is secured about an end of the tubular body by a clamp 41.

Figure 4:
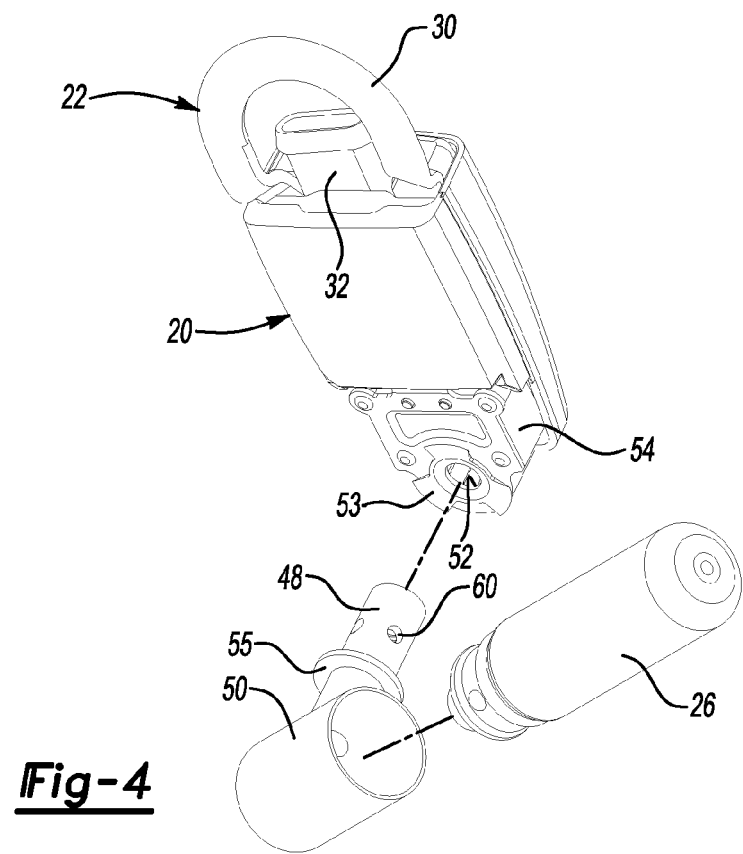
FIG. 4 is an inner perspective view of a latch with the belt anchor inserted and the compressed gas cylinder and diffuser exploded from the latch.

Referring to FIGS. 3 and 4, the latch 20 and belt anchor 22 are shown with inflator 26 and its compressed gas cylinder separated from the latch 20. The inflator 26 ports compressed gas through a conduit 48 in a collision. A receptacle 50, which is also referred to as a diffuser herein, receives the inflator 26 and is connected to the conduit 48. The latch includes a housing or manifold 54 with an opening 52 that receives the conduit 48. The housing 54 includes a housing or diffuser seal 53 that bears upon a ring 55 that is secured to or formed about the conduit 48 to prevent gas from exiting the housing 54 through the opening 52. A fastener 56 is received in a threaded inner diameter 58 of the conduit 48 to secure the conduit 48 within the housing 54. A plurality of gas outlet ports 60 are provided in the conduit 48 to open into the housing 54 and dispel gas into a cavity defined by the housing 54.

Figure 5:
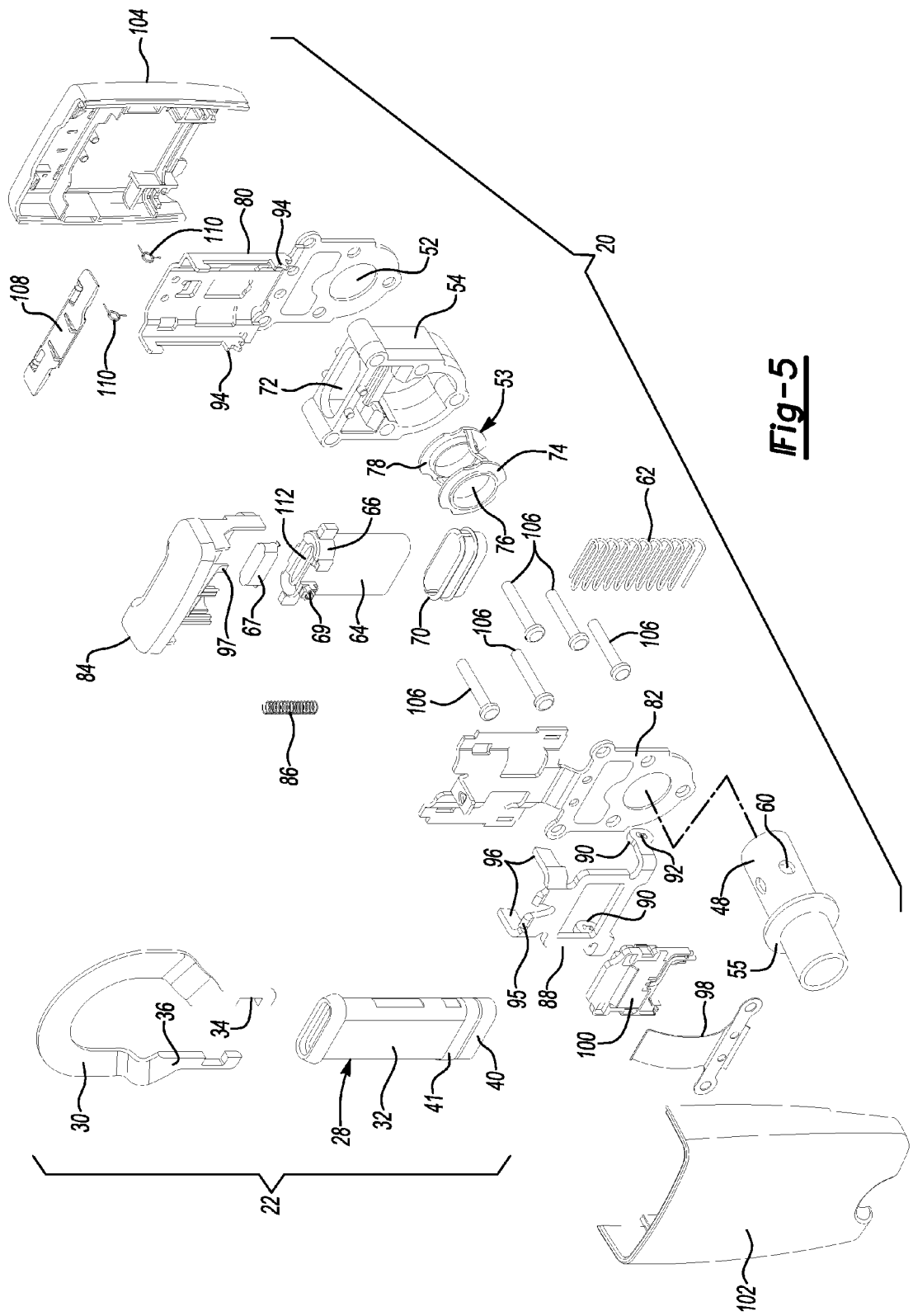
FIG. 5 is an exploded perspective view of the latch and belt anchor.
Figure 6A:
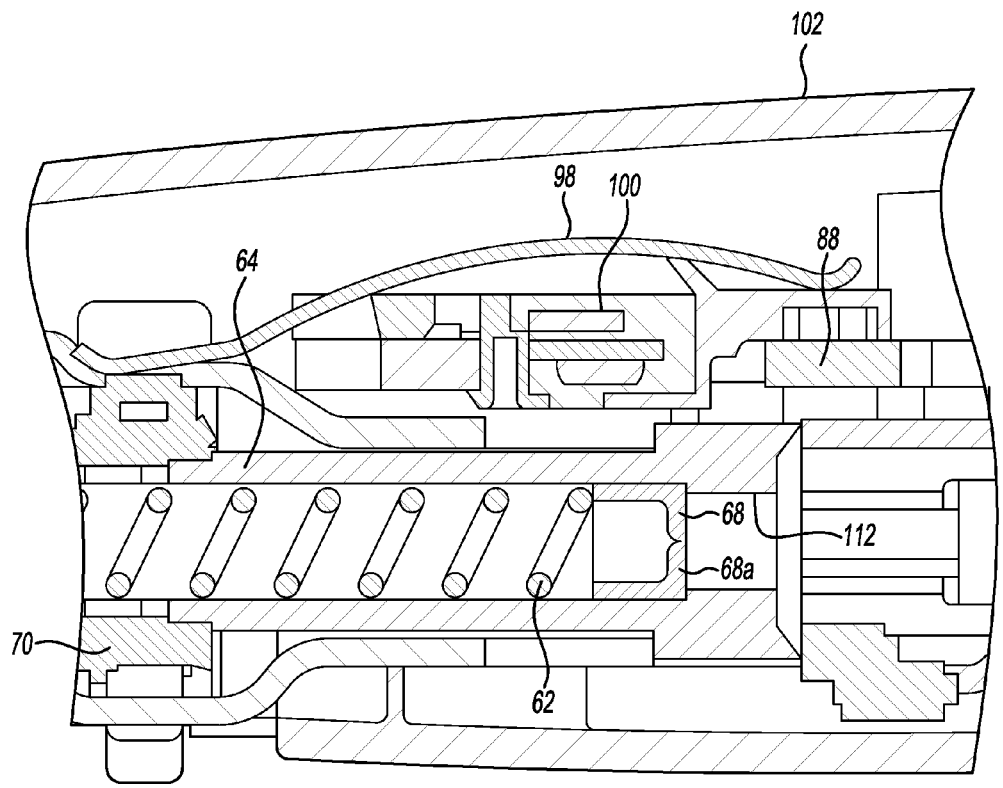
FIG. 6A is a central longitudinal cross-sectional view of the latch showing an integral ejector tube.
Figure 6B:
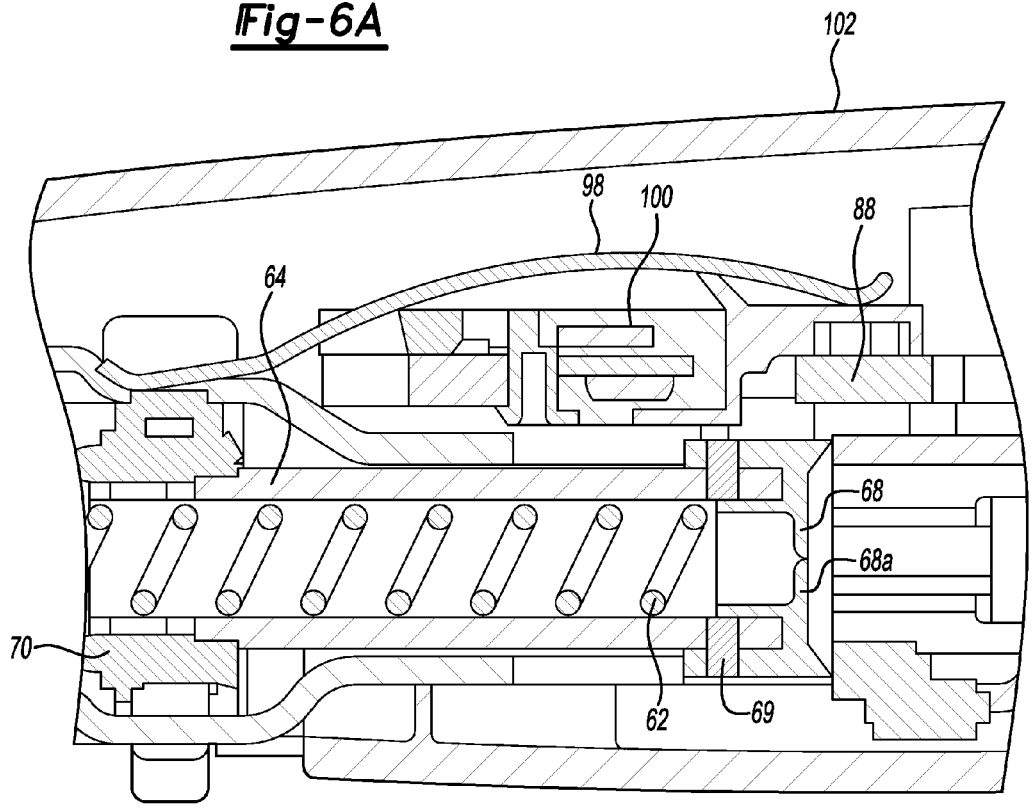
FIG. 6B is a central longitudinal cross-sectional view of the latch showing a multi-piece ejector tube.

Referring to FIGS. 5, 6A and 6B, the latch 20 and belt anchor 22 are shown in FIG. 5 in an exploded perspective view and in FIGS. 6A and 6B the latch 20 is illustrated in cross-section as it is assembled. The belt anchor 22 generally includes the tongue 28 that is adapted to be received within the latch 20. The loop 30 is attached to the sides of the tubular body 32 as shown in FIG. 2 by a braising, welding, or the like. When the loop 30 is attached to the tubular body 32, latch openings 34 are defined on opposite sides of the tubular body 32 and side flanges 36 that extend from the loop 30 to the sides of the tubular body 32.

The belt anchor 22 may include an assembled plastic seal 40 placed at or near the distal end of the tubular body. The end of the tongue 28 may be beveled for guiding the seal into engagement with the ejector tube. The seal prevents liquid and debris from entering the tubular body 32. The seal 40 can be mounted on the lower edge 41 of the tubular body 32 or placed within the tubular body to form the sealing surface. Alternatively, seal 40 can be integrally created by the metal forming the mouth or lower edge 41 of the tubular body 32. In another alternative, the seal 40 can be assembled to or secured inside the lower edge. The seal may be formed of a plastic seal material.

The latch 20 includes an ejector spring 62 that is received within an ejector tube 64. The ejector spring 62 is preferably rectangular in shape fits within the ejector tube 64. An ejector seal 66 is provided on the end of the ejector tube 64 that is opposite the housing 54 to prevent liquid and debris from entering therein. Alternatively, the seal 66 may be disposed within the ejector tube. The ejector seal 66 can be formed by the material at the opposite end of the ejector tube 64 from the manifold 54. The ejector seal 66 may also be provided as a insert 67, shown in FIG. 6B, secured to the end of the ejector tube 64. The insert 67 may also have a beveled surface to facilitate aligning the tubular body 32 relative to the ejector tube 64. The seal 66, when broken, forms two doors or parts 68 and 68a that are split when the inflator 26 is activated. A debris screen could be substituted or used in conjunction with the ejector door 68, 68a. Ejector door 68, 68a opens in a collision when inflation gas is ported from the manifold 54 through the ejector tube 64 and into the tubular body 32 of the belt anchor 22. A pin 69, as shown in FIG. 6A, secures the door 68, 68a to the ejector tube 64. A manifold seal 70 is received within a manifold opening 72 in the housing facing the ejector tube 64 to form a seal between the ejector tube 64 and housing 54.

The diffuser seal 53 of FIG. 5 includes a first annular portion 74, and an opposite annular portion 78 joined by an integral spring 76 that are assembled inside the housing 54.

A lower frame 80 is secured to one side of housing 54 and an upper frame 82 is secured to the opposite side of the housing 54. The lower and upper frames 80 and 82 form a passage 85 that receives the ejector tube 64 and spring 62. The ejector tube 64 slides within passage 85. Portions of the lower and upper frames 80 and 82 are disposed on the opposite sides of the ejector tube 64.

A release button 84 is provided to allow release of the belt anchor 22 from the latch 20. The release button 84 has a release button spring 86 that biases the release button 84 toward its extended position.

A latch keeper 88 includes a pair of arms 90 that define holes 92. The holes 92 receive ears 94 formed on the lower frame 80 that retain the latch keeper 88 on the lower frame 80 with a limited range of pivotal motion. A pair of locking tabs 96 are provided on the opposite end of the latch keeper 88 from the arms 90. The latch keeper 88 also includes a plurality of angled projections 95 which are configured to engage one or more ramped surfaces 97 on the button 84.

The locking tabs 96 engage the latch openings 34 formed on the tongue 28 of the belt anchor 22. A latch leaf spring 98 biases the latch keeper 88 toward its latched position. A Hall effect switch 100, or other type of switch, is assembled to the latch keeper 88 to provide a switch for indicating whether the belt anchor 22 is properly secured within the latch 20. A magnet 69 can be held by the ejector door 68 which operatively engages the Hall effect switch.

An upper cover 102 and lower cover 104 are assembled together to enclose the latch 20. The spring 98, upper frame 82, housing 54 and lower frame 80 are secured together by a plurality of rivets 106.

A hinged cover door 108 is shown in FIGS. 5 and 6A. Door 108 is spring biased by a pair of springs 110. The door 108 as shown in FIG. 6A blocks the space formed between frame 80 and the button 84. As the tongue 28 is inserted in the latch 20, or buckle, the tubular body 32 pushes the door 108 inwardly.

In operation, when a person is seated in the vehicle seat 12, the seat belt harness 10 must be secured by inserting the belt anchor 22 into the latch 20. Latch 20 is mounted to the search 12 to be pivotable relative to the conduit 48. In this position, the lap belt 14 extends across the lap of the occupant and the shoulder belt 18 extends diagonally across the torso of the occupant. In a collision, inputs from crash sensors, such as accelerometers mounted in various locations on the vehicle, signal a controller to activate the inflator 26.

When the inflator is discharged, inflation gas flows into the receptacle 50 of the diffuser 46 and then into the conduit 48. The compressed gas is then ported through the slot 76 in the diffuser seal 53 and into housing 54, or manifold. The inflation gas rapidly fills the manifold 54 and is directed through the manifold outlet 72 into the ejector tube 64. The manifold seal 70 and ejector seal 66 seal opposite ends of the ejector tube 64 to limit loss of the compressed gas. The upper diffuser seal 78, lower frame 80, and upper frame 82 enclose the housing 54 to contain the inflation gas. The belt anchor 22 is received in the latch 20 with locking tabs 96 being received in the latch openings 34 formed in the side flanges 36 of the tongue 28. As previously described, the latch openings 34 are provided on opposite sides of the tubular body 32. The inflation gas flows from the ejector tube 64 into the tubular body 32 of the belt anchor 22. From the tubular body 32, the inflation gas flows into the inlet tube 38 to inflate the inflatable member 16. When inflation gas enters the inflatable member 16, the inflatable member 16 splits the split two layer belt 42. The inflatable member 16 inflates and expands to provide a protective air bag that is disposed across the torso of the seat occupant.

A seal must be established between the ejector tube 64 and the tubular body 32. The seal is partially established by the ejector spring 62 biasing the ejector tube 64 and the ejector seal 66 into engagement with the seal 40 formed on the tubular body 32 of the belt anchor 22. In addition to the biasing force applied by the ejector spring 62, the force of the inflation gas also urges the ejector tube 64 outwardly due to the pressure of the gas being applied to the ejector seal and includes the ejector door 68. The biasing force applied by the gas pressure can be enhanced by providing a restriction 112 proximate the outlet end of the tubular body 32. The restriction 112 in the ejector tube 64 results in increased pressure being developed within the housing 54. The pressure applied to the ejector tube 64 complements the biasing force of the ejector spring 62.

Operation of the latch 20 in normal conditions begins with the insertion of the tongue 28 of the belt anchor 22 into the latch 20. The tubular body 32 of the tongue 28 is inserted between the lower cover on one side and the release button 84 and upper cover 102 on the other side. The tubular body 32 engages the ejector tube 64 axially with the hollow portions of each in abutment and with the seal 40 and ejector seal 66 engaging each other. When the tongue 28 is fully inserted, the locking tabs 96 of the latch keeper 88 are received in the latch openings 34 formed in the side flanges 36 of the belt anchor 22. The spring 98 biases the latch keeper 88 toward this locked position. The switch 100 may detect movement of the ejector tube 64 or magnet 69 due to the presence of the tongue 28 and indicates to the vehicle control system that the seat belt harness 10 is properly secured.

The seat belt harness 10 is released by manually depressing the release button 84 against the biasing force of the release button spring 86. The ramped surfaces 97 of the release button 84 engage the projections 95 of the latch keeper 88 lifting the locking tabs 96 from the latch openings 34. At this point, the ejector spring 62 urges the ejector tube 64 into engagement with the tongue 28 to eject the tongue 28 from latch 20.

While embodiments of the invention have been illustrated and described, it is not intended that these embodiments illustrate and describe all possible forms of the invention. Rather, the words used in the specification are words of description rather than limitation, and various changes may be made without departing from the spirit and scope of the invention.

What is claimed is:

1. An inflatable seat belt system comprising:
   a seat belt including a tubular seat belt sleeve with an inflatable member being contained within the sleeve;
   a source of inflation gas;
   a buckle assembly including a first part of a latch mechanism;
   a seat belt anchor having a tongue that is a second part of the latch mechanism that is selectively engaged by the first part of the latch mechanism in a latched state in which the seat belt anchor is secured to the buckle assembly and is disengaged in a released state in which the seat belt anchor may be removed from the buckle assembly;
   the buckle assembly has a first hollow tube that defines a first gas flow path through which an inflation gas is provided through the buckle assembly to the tongue from the source of inflation gas, the first hollow tube having a first and second end, the first end includes a first seal surface, the second end receives the inflation gas from the source of inflation gas;
   the tongue is an integral tubular body that defines a second gas flow path through which the inflation gas flows from the first gas flow path to the inflatable member, the tongue includes a hollow second tube having has a first and second end, the first end of the second tube includes a second seal surface to create a gas seal with the first end of the first hollow tube when the latch mechanism is in the latched state, and the second end of the second hollow tube tongue is in communication with an inlet of the inflatable member; and
   a spring biases the first end of the first hollow tube into engagement with the tongue when the latch mechanism is in the latched state to hold the first and second seal surfaces together.

2. The system according to claim 1 wherein the spring is operatively connected to the first tube to eject or push the tongue from the buckle assembly when the latch mechanism is moved to the released state.

3. The system according to claim 1 including a latch mechanism spring for biasing the latch mechanism toward a locked position.

4. The system according to claim 1 wherein the first seal surface has a first shape and the second seal surface has a second shape that is complimentary to the first shape.

5. The system according to claim 1 including a first particulate filter blocking debris from passing through the first tube.

6. The system according to claim 5 including a second particulate filter blocking debris from passing through the second tube.

7. The system according to claim 6 wherein the first and second particulate filters are disposed proximate to the first and second seal surfaces.

8. The system according to claim 1 further comprising a door that is hingedly connected to the buckle assembly and biased by at least one spring to cover a space in the buckle assembly through which the tongue is inserted into the buckle.

9. An inflatable seat belt system comprising:
   a seat belt including a tubular seat belt sleeve with an inflatable member being contained within the sleeve;
   a source of inflation gas;
   a buckle assembly including a first part of a latch mechanism;
   a seat belt anchor having a tongue that is a second part of the latch mechanism that is selectively engaged by the first part of the latch mechanism in a latched state in which the seat belt anchor is secured to the buckle assembly and is disengaged in a released state in which the seat belt anchor may be removed from the buckle assembly;
   the buckle assembly has a first hollow tube that defines a first gas flow path through which an inflation gas is provided through the buckle assembly to the tongue from the source of inflation gas, the first hollow tube having a first and second end, the first end includes a first seal surface, the second end receives the inflation gas from the source of inflation gas;

the tongue is an integral tubular body that defines a second gas flow path through which the inflation gas flows from the first gas flow path to the inflatable member, the tongue includes a hollow second tube having has a first and second end, the first end of the second tube includes a second seal surface to create a gas seal with the first end of the first hollow tube when the latch mechanism is in the latched state, and the second end of the second hollow tube tongue is in communication with an inlet of the inflatable member; and a spring biases the first end of the first hollow tube into engagement with the tongue when the latch mechanism is in the latched state to hold the first and second seal surfaces together, wherein the buckle assembly is secured to a mounting surface to pivot about an axis of rotation between defined positions, and wherein the buckle assembly further comprises a housing that defines a cavity and a conduit that is received in the cavity, the conduit directing the inflation gas to the first gas flow path, the conduit being coaxial with the axis of rotation, wherein the housing receives the conduit and pivots about the conduit.

10. An inflatable seat belt system comprising:

a seat belt including a tubular seat belt sleeve with an inflatable member being contained within the sleeve;

a source of inflation gas;

a buckle assembly including a first part of a latch mechanism;

a seat belt anchor having a tongue that is a second part of the latch mechanism that is selectively engaged by the first part of the latch mechanism in a latched state in which the seat belt anchor is secured to the buckle assembly and is disengaged in a released state in which the seat belt anchor may be removed from the buckle assembly;

the buckle assembly has a first hollow tube that defines a first gas flow path through which an inflation gas is provided through the buckle assembly to the tongue from the source of inflation gas, the first hollow tube having a first and second end, the first end includes a first seal surface, the second end receives the inflation gas from the source of inflation gas;

the tongue is an integral tubular body that defines a second gas flow path through which the inflation gas flows from the first gas flow path to the inflatable member, the tongue includes a hollow second tube having has a first and second end, the first end of the second tube includes a second seal surface to create a gas seal with the first end of the first hollow tube when the latch mechanism is in the latched state, and the second end of the second hollow tube tongue is in communication with an inlet of the inflatable member; and a spring biases the first end of the first hollow tube into engagement with the tongue when the latch mechanism is in the latched state to hold the first and second seal surfaces together, wherein the tongue includes two latch openings on opposite sides of the second hollow tube, the latch mechanism engages the two latch openings in the latched state and disengages the latch openings released state.

11. The system according to claim 10 wherein the latch mechanism further includes two latch legs that are each movable relative to a buckle frame and through one of the latch openings of the tongue.

12. The system according to claim 11 wherein the buckle frame includes first and second frame portions, the first and second frame portions define a tubular passage for receiving the tongue and for guiding the tongue toward the first tube.

13. The system according to claim 12 wherein the first tube is movable relative to the tubular passage.

14. The system according to claim 12 wherein the first and second frame portions each include sets of two opposing frame openings and wherein each latch leg in the locked position is first movable through a first frame opening, a latch opening of the tongue and through a second frame opening.

15. The system according to claim 11 wherein the latch mechanism includes a first ramp portion configured to engage with a second ramp portion of a movable button, the button being biased away from the first ramp portion by a button spring, the button being movable from a first position to a second position against the bias of the button spring, the button when moved to the second position engaging the first ramp to cause the latch legs to move out of the latch openings in the tongue to release the tongue.

16. An inflatable seat belt system comprising:

a seat belt including a tubular sleeve in which an inflatable member is received;

a source of inflation gas;

a buckle assembly including a latch mechanism, the buckle assembly has a manifold that defines an enclosed cavity, a conduit is received in the cavity and defines an axis of rotation, wherein the manifold receives the conduit and rotates about the axis of rotation, wherein the conduit, the manifold and a first hollow tube defines a first gas flow path through which inflation gas is provided through the buckle assembly from the source of inflation gas;

a seat belt anchor having a tongue that is selectively engaged by the latch mechanism in a latched state in which the seat belt is secured to the buckle assembly and is disengaged in a released state in which the seat belt anchor may be removed from the buckle assembly, the tongue is a tubular body that defines a second gas flow path through which inflation gas flows from the first gas flow path to the inlet of the inflatable member;

a second hollow tube having a first end and a second end, the first end of the second hollow tube engaging the first hollow tube and the second end of the second hollow tube opening into the inlet of the inflatable member;

wherein the first hollow tube includes a first end that receives the inflation gas from the cavity and a second end that is in communication with the first end of the second hollow tube wherein the second end of the first hollow tube is movable relative to the first end of the second hollow tube, wherein the first hollow tube is provided with a restriction that is disposed in the first gas flow path, and wherein when the inflation gas flows through the first gas flow path, the first hollow tube is driven towards the second hollow tube and thereby seals between first and second seals;

the first seal is provided on the second end of the first hollow tube;

the second seal on the first end of the second tube seals against the first seal; and a spring biases the second end of the first hollow tube into engagement with the second seal when the latch mechanism is in the latched state to hold the first and second seals together.

17. An inflatable seat belt system comprising:
a source of inflation gas;
a buckle assembly including a latch mechanism that defines a first gas flow path through which inflation gas is provided through the buckle assembly from the source of inflation gas;
an anchor having a tongue that is selectively engaged by the latch mechanism in a latched state in which the anchor is secured to the buckle and is disengaged in a released state in which the anchor may be removed from the buckle assembly, wherein the tongue defines a second gas flow path within the tongue; and
a seat belt including a tubular sleeve in which an inflatable member is received, the inflatable member being attached to the seat belt at a first end and the inflatable member being attached to the seat belt at a second end at a location that is closer to the tongue than the first end, the inflatable member having an inlet tube that receives inflation gas that flows from the second gas flow path to the inlet tube of the inflatable member, and wherein the second end of the inflatable member further comprises a first corner portion and a second corner portion that are folded over and sewn to the seat belt while the inlet tube is disposed between the first and second corners in an area that is not sewn to the seat belt.

* * * * *